COMPUTER FOR SOLVING TRIGONOMETRIC EQUATIONS

Filed Aug. 2, 1963 3 Sheets-Sheet 1

INVENTORS:
BRUCE B. YOUNG
CHARLES A. BELSTERLING
BY Howson & Howson
ATTYS.

INVENTORS:
BRUCE B. YOUNG
CHARLES A. BELSTERLING
BY Howson & Howson
ATTYS.

COMPUTER FOR SOLVING TRIGONOMETRIC EQUATIONS

Filed Aug. 2, 1963 3 Sheets-Sheet 3

INVENTORS:
BRUCE B. YOUNG
CHARLES A. BELSTERLING
BY Howson & Howson
ATTYS.

United States Patent Office 3,465,135
Patented Sept. 2, 1969

3,465,135
COMPUTER FOR SOLVING TRIGONOMETRIC EQUATIONS

Charles A. Belsterling, Norristown, and Bruce B. Young, Radnor, Pa., assignors, by mesne assignments, to the United States of America as represented by the Secretary of the Army Filed Aug. 2, 1963, Ser. No. 299,551
Int. Cl. G06g 7/22
U.S. Cl. 235—189 3 Claims

ABSTRACT OF THE DISCLOSURE

A computer for changing from a spherical coordinate system to a plane rectangular coordinate system, wherein input signals are applied to a resolver section and the resolver outputs are combined so as to obtain signals corresponding to transformation functions; these signals are applied to servo-loops for the determination of the rectangular coordinates.

This invention relates to a computer for solving trigonometric equations and more particularly to a computer which is useful for translating spherical coordinates, or the like, into rectangular coordinates in accordance with a transformation formula.

It is relatively common today to have a situation in which it is necessary or desirable to translate a position from one set of coordinates to another which may more readily or usefully be employed for any given purpose. Representative of this situation is the one involving a so-called "Skyscreen" camera which is intended to take pictures on a single film of successive positions of an object being tracked as it moves through the sky. To accomplish this purpose a special camera was devised which is provided with a pair of opaque curtains each having a transparent or open slit. The slits are arranged perpendicular to one another and each curtain is movable perpendicular to its slit. By this means successive small rectangular areas at the intersection of the slits may be exposed and if the curtains are moved in such a way as to follow the object being tracked the rectangular areas at the intersection of the slits will coincide with the image of the object so that it can be photographed. It will be apparent that the curtains for this device must be most precisely positioned or else the area exposed will not coincide with the image of the object being tracked. Information on the object being tracked in the terms of spherical coordinates is provided by a conventional tracking instrument which by known means is caused to follow the missile by radar, or otherwise. The elevation and azimuth of the principal axis of the camera may be used as the reference from which the elevation and azimuth of the instrument are measured. By trigonometric analysis, a conversion from spherical coordinates of the sky or celestial sphere to the rectangular coordinates of the focal plane of the camera can be obtained. From this solution the $x$ coordinate is used to position one curtain and the $y$ coordinate to position the other, using suitable drive means of known type.

In accordance with the present invention several techniques are employed. In particular in addition to obtaining the trigonometric function of a variable, in accordance with the present invention it is possible to obtain a product of trigonometric functions. By known techniques the functions or their products may be summed in order to obtain a polynomial function or series. Whether or not this is done, however, expressions are derived which represent a factor and the same factor times an unknown, respectively, so that by a factoring or cancellation process the unknown may be obtained. In accordance with the present invention this process is accomplished through a servo loop which contains comparison means which compares the signal representing the product of the factor and the unknown with the same product as derived by servo position. Until the derived product signal is exactly equal to the known product, the position of the servo is changed so that when the servo position becomes fixed it is representative of the unknown.

More specifically the system for deriving products of trigonometric functions consists of at least first and second resolvers each having a shaft, a reference winding and at least one signal winding, the relative positions of said windings being changed by the shaft. A given shaft position representing an angle will cause an output from the signal winding equal to a trigonometric function typically sine or cosine of that angle. As is conventional, a source of reference excitation applied to the reference winding of the first resolver will produce an output in the form of a trigonometric function of the angle represented by shaft position. In this case means is provided to connect the signal winding of the first resolver to the reference winding of the second resolver and thus impose on that reference winding the trigonometric function output from the first resolver. The output of the second resolver still proportional to a trigonometric function of the function represented by the shaft position but by transformer action is also proportional to the trigonometric function imposed on the reference winding. In this way a signal is provided which is effectively the product of the two trigonometric functions.

The comparison system may be described in terms of one of the rectangular coordinates $x$ or $y$ which is sought. For example, if a product of a factor D times the unknown $x$ is known and is compared with a similar product wherein D is known but the $x$, and therefore the product, is derived and the unknown $x$ is changed until the products are the same, at that point $x$ is known. If $x$ is a rectangular coordinate which is constantly changing as the spherical coordinates from which it is derived change, then the servo motor will constantly correct the position of $x$ to correspond with each new position in terms of the sensed spherical coordinates. Specifically if the D signal obtained is applied across a potentiometer with a movable tap and the servo motor is used to position the tap, the tap position will represent the unknown $x$ and the signal obtained from the tap will be the derived D$x$ signal. If this is fed back to the same comparison means to which the known D$x$ signal is applied, any difference between the two signals will constitute error which can be used to drive the servo motor and if provided with proper polarity will drive the movable tap of the potentiometer in the direction required to correct the error until the error is eliminated. At this point the tap and the shaft positions are representative of the true value of $x$.

For better understanding of the present invention one embodiment of the invention employed with the Skyscreen camera will be described and this embodiment is shown in the accompanying drawings as follows.

Figure 1:
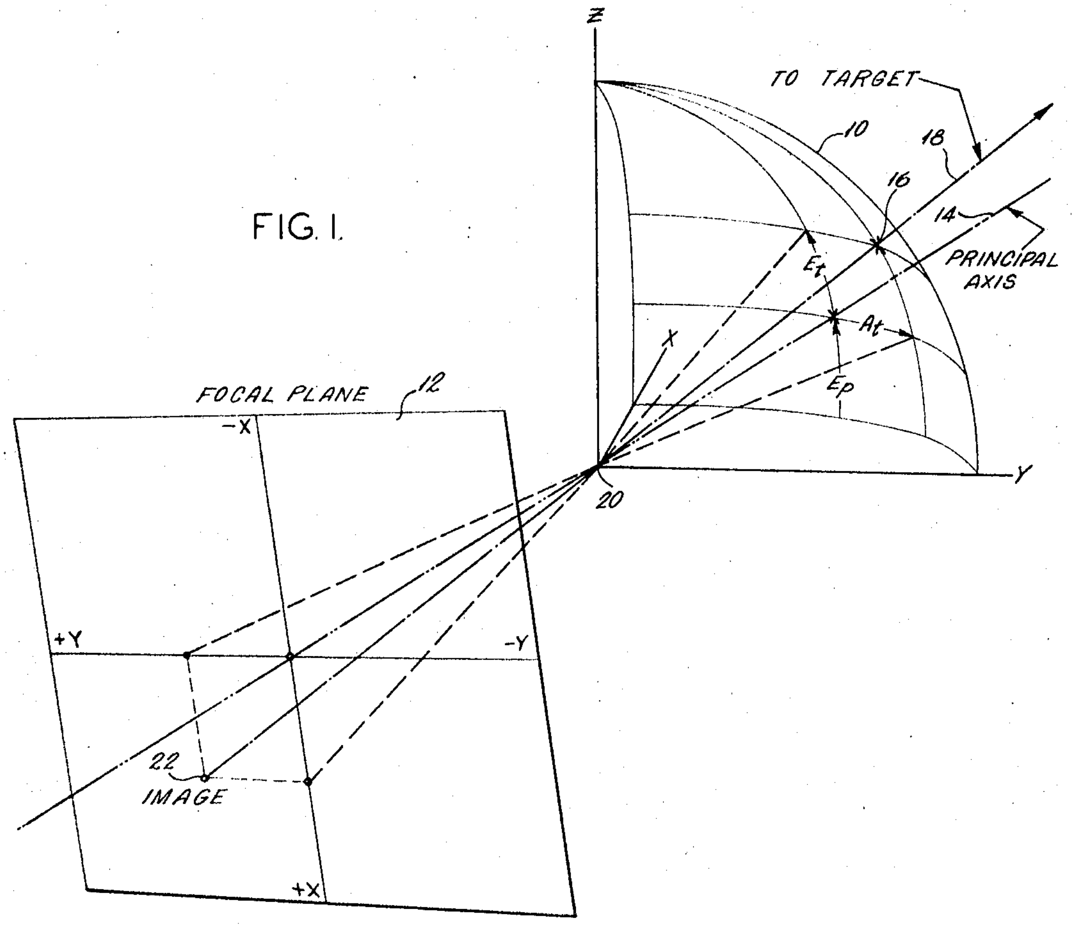
FIGURE 1 is a diagrammatic showing of the coordinate transformtaion problem involved in the Skyscreen camera.

Referring first to FIG. 1 the problem of the Skyscreen camera is shown diagrammatically. Here a portion of the sky represented by a segment 10 of a spherical surface can be viewed over the entire focal plane 12 of the Skyscreen camera assuming a given lens focal length. Assuming the azimuth of the camera fixed and the elevation of its principal optical axis set at an angle $E_p$, the intersection of the principal axis 14 with the spherical segment 10 determines a zero reference point which may be correlated with the intersection of $x$ and $y$ axes on the focal plane. A target which appears along a line 18 passing through point 16 on the spherical surface will be caused by the camera lens system to pass through a common focal point 20 and assume a particular image position 22 on the focal plane. The position 16 may be determined relative to the principal axis in terms of azimuth degrees $A_t$ and elevation degrees $E_t$ therefrom and this location has corresponding $x$ and $y$ coordinates located in the focal plane. If it is imagined that the focal plane, in addition to being shut off from light by the usual shutter, is also screened by a pair of movable opaque curtains, the nature of the Skyscreen camera can be appreciated. One of the curtains is provided with a light transmitting slit of predetermined width, the full length of the focal plane and generally parallel to the $x$-axis and that curtain is movable only parallel to the $y$-axis. Similarly the other curtain is provided with a light transmitting slit of similar width the full length of the focal plane but parallel to the $y$-axis and that curtain is movable only in the direction of the $x$-axis. In order for a picture of the image to be obtained the slits in the curtains must be positioned to intersect exactly over that portion of the focal plane at which the image will be located. In order for this to be done the curtain with its slit parallel to the $x$-axis must be moved by drive means which responds to select its $y$ position and the curtain with the slit parallel to the $y$-axis must be moved by drive means which responds to signals which positions the slit at some position along the $x$-axis. The signals for accomplishing the positioning of the respective curtains must be derived from known information with respect to location of the principal axis and elevation and azimuth of the target with respect thereto. The position of the camera presumably on a fixed known azimuth may be obtained by means sensing the elevation of its principal axis. The elevation and azimuth of the instrument tracking the target can then be used relative to the position of the principal axis to derive the required rectangular coordinates.

The problem of converting from relative azimuth and elevation orientation of a tracking instrument of the rectangular coordinates has been analyzed in detail in Report #880 to the Ballistics Research Laboratory, U.S. Army Ordnance Proving Ground, Aberdeen, Md., entitled "An Analytical Treatment of the Orientation of a Photogrammetic Camera" by H. H. Schmid. These equations (Equation 44A of Report #880) were simplified for the purpose of the computer described herein through the following assumptions:

(1) The azimuth angle of the principal axis (center line) of the camera is the zero or reference azimuth angle for the Skyscreen computer.

(2) The camera and tracking device are both levelled and are very close together so that their azimuth-elevation coordinate systems are considered to be identical in orientation and location. These assumptions permit simplication of the Equations 44A in Report #880 as follows:

$$-x=C\frac{X\cos v-Z\sin v}{X\sin v+Z\cos v}\qquad(1)$$

$$y=C\frac{Y}{X\sin v+Z\cos v}\qquad(2)$$

where:

$v$ is the coelevation or zenith angle.

$x$ and $y$ are the rectilinear coordinates in the focal plane.

and X, Y and Z are the cartesian coordinates of the target.

We now introduce a new notation as follows:

$E_p=90°-v$=elevation angle of the principal point of the camera.

$E_t$=elevation angle of the target.

$A_t$=azimuth angle of target relative to azimuth angle of principal point of the camera.

In the spherical coordinate system of E and A the cartesian coordinates become at unit radius:

$X=\cos E_t\cos A_t$ $Y=\cos E_t\sin A_t$ $Z=\sin E_t$

Substituting this notation into Equations 1 and 2 gives $$-x=C\frac{\sin E_t\cos E_p-\cos E_t\sin E_p\cos A_t}{\cos E_t\cos E_p\cos A_t+\sin E_t\sin E_p}\qquad(3)$$

and $$y=C\frac{\cos E_t\sin A_t}{\cos E_t\cos E_p\cos A_t+\sin E_t\sin E_p}\qquad(4)$$

These are the equations which are to be solved by the Skyscreen Computer. It will be seen that these equations permit solution in terms of rectangular coordinates in the focal plane of positions sensed in terms of spherical coordinates.

Figure 2:
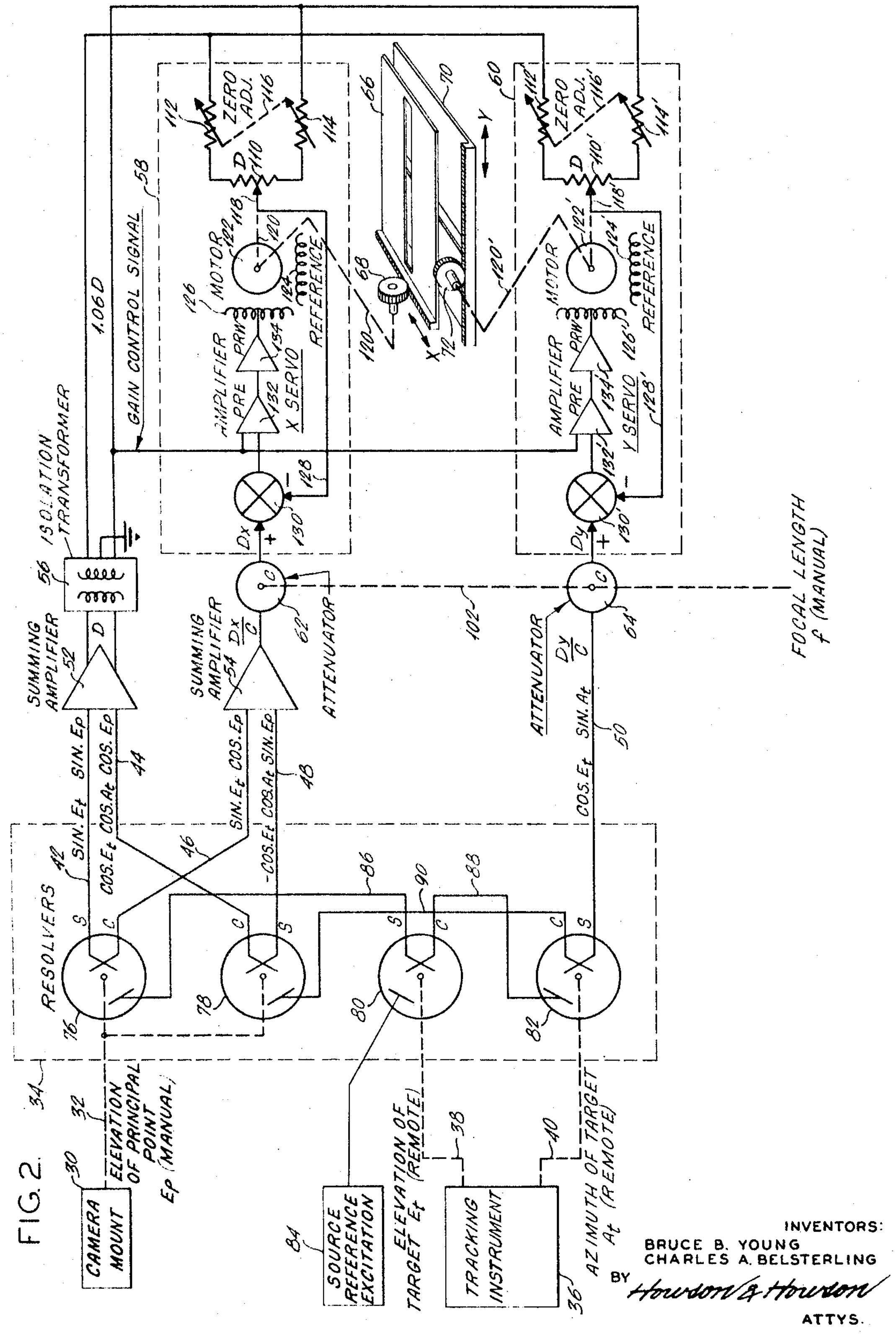
FIGURE 2 is a schematic block diagram showing the computer for solving equations necessary to transfer from spherical to rectangular coordinates and position the curtains of the Skyscreen camera.

Referring now to FIGURE 2, the Skyscreen Computer system is shown schematically. As previously noted information relative to the elevation of the principal axis $E_p$ is obtained from the Skyscreen camera mount 30 and fed manually into the resolver section 34 of the computer. Similarly information relative to said principal axis on the target elevation $E_t$ and the target azimuth $A_t$ is obtained from the target tracking instrument and fed through suitable mechanical linkages 38 and 40 respectively to the resolver section 34 of the computer. In this particular instance the resolver, which will be explained in greater detail hereafter, puts out electrical signals in the form of trigonometric functions through five channels 42, 44, 46, 48 and 50. Signal channels 42 and 44, respectively, provide a summing amplifier 52 with signals representative of $\sin E_t\sin E_p$ and $\cos E_t\cos A_t\cos E_p$. Channels 46 and 48 supply summing amplifier with signals representative of the $\sin E_t\cos E_p$ and $-\cos E_t\cos A_t\sin E_p$ in order to obtain the sum of those two signals. Channel 50 provides a signal $\cos E_t\sin A_t$ which is subjected to no summing. It will be observed immediately that the output of summing amplifier 52 is the denominator D common to both Equations 3 and 4 above. This signal is fed to an isolation transformer 56 in order to obtain an output symmetrical with respect to ground and a slight gain is provided to provide for planned attenuation in the circuit. Instead of the denominator D exactly the output may be 1.06D and the signal is fed into a servo loop 58 for comparison with a modification of the signal output from summing amplifier 54 in order to obtain the $x$ coordinate. Similarly the output of the isolation transformer 56 is fed into a servo loop 60 for comparison with a signal from a modified signal from line 50 in order to obtain the $y$ coordinate.

By observation of Equation 3 it will be seen that the signal output from summing amplifier 54 is equal to the numerator of the equation expressed. By transposition of terms where D represents the denominator the output then represents $Dx/C$. C is a constant which in the Skyscreen system has to do with the given lens focal length used with the Skyscreen camera. Some adjustment is obviously necessary in order to adjust the fixed size focal plane of the camera to the varying segment of the celestial sphere which can be viewed with various lens focal lengths and this is accomplished by means of the focal length attenuator 62 which has the effect of cancelling out the C and leaving an output to be fed to the servo comparison loop 58 representative solely of D$x$. Similarly the signal on line 50 is representative of $Dy/C$ and an attenuator 64 serving a similar function to attenuator 62, i.e. the cancellation of the constant C. Proper adjustment leaves a signal D$y$ to be fed to the comparison servo loop 60. As will be described in greater detail hereafter the mechanical output from the servo loop 58 is used to adjust the position of the $x$ coordinate curtain through suitable repositioning means, here shown as rack and pinion 68. Similarly mechanical output of the servo of loop 60 adjusts the position of the $y$ curtain 70 by suitable adjusting means, here shown as rack and pinion 72. Since the structure of the Skyscreen camera is known, and furthermore is merely illustrative of the application of the present invention, greater detail of the structure and its operation is deemed unnecessary. It will be appreciated, however, that the adjustment which is being accomplished by the computer is resolution in terms of the Equations 3 and 4 of spherical coordinates on the celestial sphere to rectangular coordinates on the focal plane of the Skyscreen camera.

Turning for the moment to a consideration of the resolver system it will be appreciated from the previous discussion that the purpose of this system is to translate a mechanical input which, for example, may be in terms of angular shaft position to an electrical output representing certain predetermined products of trigonometric functions of these angles. In this case there are three angular shaft positions 32, 38, 40 representing respectively the angles $E_p$, $E_t$ and $A_t$. The electrical outputs described above are those of channels 42, 44, 46, 48 and 50. Various types of resolvers are so well known that it is unnecessary to describe in detail any one type of those commercially available. It is to be understood that while rotational types are described herein, linear types or other variations of the resolver principle could be used in this or other applications of the present invention. In principle, rotational resolvers have fixed and movable windings, one serving as the reference or input and the other serving as the signal or output winding. In practice there may be more than one winding of each type and in this instance there are assumed to be a pair of output windings, preferably the fixed windings, which are arranged at 90 electrical degrees to one another. If these windings are fixed, the reference winding is rotationally movable by the shaft and its mechanical input. In this case when a signal is imposed on the reference winding, the cosine of an angle represented by shaft position will be obtained from one output winding and the sine of the same angle obtained from the other output winding. The situation is similar for resolvers 76, 78, 80 and 82. Resolvers 76 and 78 are driven by the same shaft 32 either by an in-line arrangement or suitable gearing and as previously indicated the position of shaft 32 represents the angle $E_p$. The mechanical input to resolver 80 is shaft 38 whose position represents angle $E_t$ and the mechanical input to resolver 82 is shaft 40 whose position represents angle $A_t$.

In this particular arrangement an alternating current reference signal, which may be 400 cycles of predetermined amplitude, is obtained from a source of reference excitation 84 and applied to the reference winding of resolver 80. Since its shaft position represents angle $E_t$ the output of its sine winding will be sin $E_t$ and the output of its cosine winding will be cos $E_t$. The sine output is applied through channel 86 to the reference winding of resolver 76 and therefore provides a reference excitation sin $E_t$ which by transformer action is supplied to the sine and cosine output windings of resolver 76. However, the relative positions of each of these output windings to the reference winding is determined by shaft 32 so that their respective outputs are also proportional, respectively, to sin $E_p$ and cos $E_p$. It is because of the combined signals that the output to channel 42 is a product sin $E_t$ sin $E_p$ and the output to channel 46 is sin $E_t$ cos $E_p$.

Similarly since the output from the cosine winding of resolver 80 is fed through channel 88 to the reference winding in resolver 82 the output of its sine winding to channel 50 is cos $E_t$ sin $A_t$. The output of the cosine winding of resolver 82 is fed through channel 90 to the reference winding of resolver 78. The signal applied on that reference winding is therefore cos $E_t$ cos $A_t$. Since the shaft position of shaft 32 determines the final product of resolver 78 the output of its cosine winding to channel 44 is cos $E_t$ cos $A_t$ cos $E_p$. The output of its sine winding, by proper selection of polarity, is $-$cos $E_t$ cos $A_t$ sin $E_p$.

Figure 3:
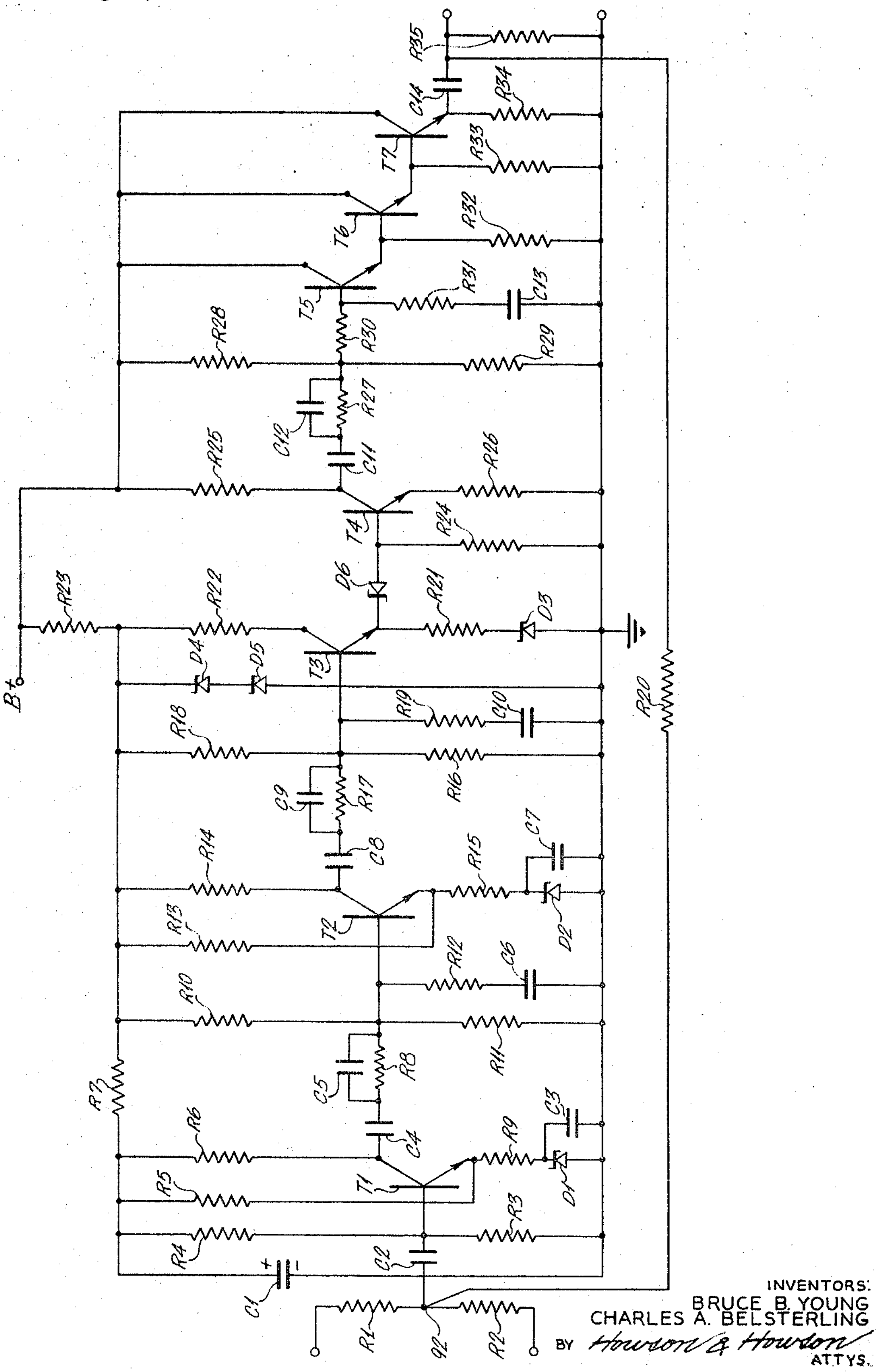
FIGURE 3 is a circuit diagram of a summing amplifier which advantageously may be used in the system of FIG. 2.

The summing amplifiers 52 and 54 in many respects are conventional semi-conductor circuits. However at the time of the design of the Skyscreen camera no commercially available amplifiers could meet its unusually demanding specifications. Consequently, similar amplifiers were devised for both of these summing amplifiers, any differences being primarily differences in values of components which would be apparent to a designer skilled in the art. These amplifiers have an open loop gain of 10,000 volts per volt in order to provide the necessary compensational stability of 0.01 percent with a closed loop gain of approximately 1.0. They have an open loop frequency response properly shaped to permit a feedback factor of 100 percent. They are capable of undistorted sinusoidal output of 20 volts RMS (nearly 60 volts peak to peak). Finally they supply current to a 500 ohm load. As seen in FIG. 3 the respective signals from channels 46 and 48 are supplied to resistors R1 and R2 respectively of amplifier 54 which are connected together at a summing junction 92. The first stage gain through transistor T1 is 47.5. An attenuation between stages of .41 is achieved by resistor R8 and its associate circuitry prior to the second transistor stage. A second amplifier stage including transistor T2 produces a gain of 44.5. R17 and its associated circuitry produce an attenuation between the second and third stages of .73. The third amplifier stage including transistor T3 is an emitter follower circuit which has a gain of .99. This is followed by another amplifier satge including transistor T4 having a gain of 17. The emitter follower chain of transistors T5, T6 and T7 produce a gain of .99. This circuit is provided with feed back through resistor R20 and is supplied with B+ and ground as shown.

Typical values of circuit components are shown in the table as follows:

| | | | |
|---|---|---|---|
| R1 | 1 meg. | R19 | 2.27K |
| R2 | 1 meg. | R20 | 1 meg. |
| R3 | 1.05 meg. | R21 | 5.1K |
| R4 | 733K | R22 | 1.53K |
| R5 | 20K | R23 | 3300 |
| R6 | 51K | R24 | 1.5K |
| R7 | 1K | R25 | 627K |
| R8 | 1.038 meg. | R26 | 247 |
| R9 | 600 | R27 | 202K |
| R10 | 670K | R28 | 135K |
| R11 | 750K | R29 | 198K |
| R12 | 2.27K | R30 | 50K |
| R13 | 20K | R31 | 4.54K |
| R14 | 51K | R32 | 1 meg. |
| R15 | 600 | R33 | 110K |
| R16 | 280K | R34 | 250 |
| R17 | 357K | R35 | 10K |
| R18 | 347K | | |
| C1 | 80 mf. | C8 | 47 mf. |
| C2 | 5 mf. | C9 | .0175 mf. |
| C3 | 50 mf. | C10 | .0058 mf. |
| C4 | 47 mf. | C11 | 180 mf. |
| C5 | .0061 mf. | C12 | .402 mf. |
| C6 | .0058 mf. | C13 | .0029 mf. |
| C7 | .015 mf. | C14 | 2 mf. |

| | | | |
|---|---|---|---|
| T1 | 2N543 | D1 | 18v. 750 mw. |
| T2 | 2N543 | D2 | 18v. 750 mw. |
| T3 | 2N543 | D3 | 11v. 750 mw. |
| T4 | 2N657 | D4 | 18v. 750 mw. |
| T5 | 2N341A | D5 | 18v. 750 mw. |
| T6 | 2N498 | D6 | 14v. 250 mw. |
| T7 | 2N1650 | | |

It will be understood that amplifier 52 differs from amplifier 54 circuitwise by the addition of capacitors in parallel with resistors R1 and R2 for such phase correction as may be required. Also certain differences in values of circuit elements dictated by circuit design considerations, the signals received, etc., are included.

Figure 4:
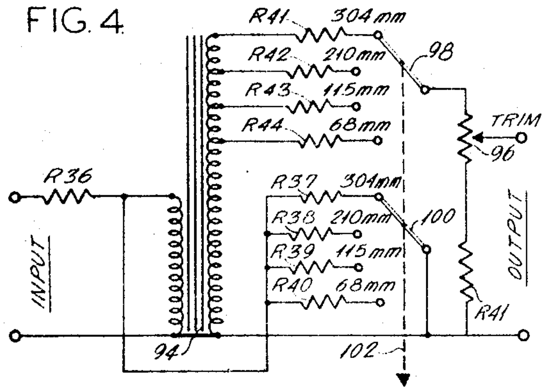
FIGURE 4 is a circuit diagram of the $x$ channel focal length attenuator circuit used in a preferred embodiment of the present invention.

The output of summing amplifier 54 is fed into the input of attenuator 62, shown in FIGURE 2. Attenuator 62, as shown in detail in FIGURE 4, has four functions: first it adjusts the scale factor for proper ratio of vertical screen travel for an increment of voltage representing the numerator of Equation 3; secondly it steps up the voltage from the summing amplifier; thirdly it provides for major changes in focal length for different standard lenses of the photographing Skyscreen camera; and finally it provides a trim adjustment to compensate for minor variations in nominal focal length of standard lenses. The series input resistor R36 in combination with a set of loading resistors R37, R38, R39, R40 sets the scale factor. The transformation of ratio of the transformer 94 steps up the voltage out of the summing amplifier. Taps on the transformer secondary in series with resistors R41, R42, R43, R44 provide the steps for major changes in the focal length, 304 mm., 210 mm., 115 mm. and 68 mm., and the adjustable voltage divider ±3% trim of the resistances representing the four major values of focal length. The selection switches 98 and 100 are mechanically ganged to select appropriate resistors for the respective circuits to provide for changes in focal length between different standard lenses.

Figure 5:
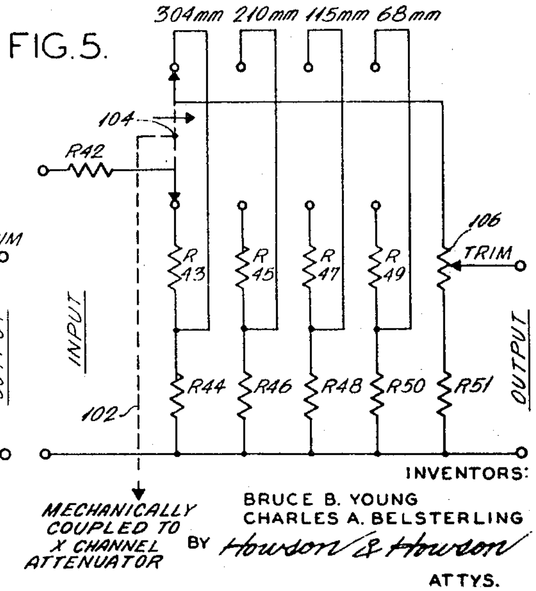
FIGURE 5 is a circuit diagram of the $y$ channel focal length attenuator used in a preferred embodiment of the present invention.

The mechanically ganged switches of attenuator 62 are also mechanically coupled by means 102 seen in FIG. 2 to comparable switches in attenuator 64 so that both attenuators may be manually or automatically adjusted when a change is made in lens focal length. The signal from channel 50 is applied to the input of attenuator 64. The attenuator 64 shown in detail in FIG. 5 has three functions: first, to adjust the scale factor of the attenuator for proper ratio of screen travel to an increment of voltage representing the numerator of Equation 2; second, to provide for major changes in the ratio to adjust for focal lengths of different lenses; and third, to provide a trim on the fixed ratios representing nominal focal lengths of standard lenses to allow for precise setting to actual focal length. The signal from channel 50 is fed into the series input resistor R42, the network of resistors R43, R44, R45, R46, R47, R48, R49 and R50 provides a constant input-impedance network and with input resistor R42 set the basic scale factor. A switch 104 is used to select one of the voltage dividers thus provided to adapt to one of four major changes in focal length, 304 mm., 210 mm., 115 mm., and 68 mm. The adjustable voltage divider 106 in series with resistor R51 at the output is preferably a 3-turn precision potentiometer to provide for approximately ±3% trim of the four major changes of focal length. The switch position selected for switch 104 is in accordance with the lens focal length selected. The output from the attenuators 62 and 64 as previously explained are signals representative of D*x* and D*y* respectively and these are fed to servo systems 58 and 60 respectively.

Considering servo system 58 as shown in FIG. 2 within the dashed line it will be seen that the output potential 1.06D of transformer 56 is applied across parallel resistor networks one of which consists of load resistor 110 and trimming resistors 112 and 114. Resistors 112 and 114 are so selected that the total drop across them will be .06 leaving a drop across resistor 110 of D. Resistors 112 and 114 are adjustable for the purpose of zero adjustment and are ganged mechanical arrangement 116 for simultaneous adjustment which keeps their total resistance constant as their individual values are adjusted so that the drop across them will remain constant at .06D. Resistor 110 is part of a potentiometer the movable tap 118 of which is moved by the shaft 120 of servo motor 122 which typically has a reference winding 124 and a signal winding 126. Shaft 120 is also the means which drives the adjustment element 68 for positioning the *x* curtain 66 and the shaft position is representative of the unknown *x* coordinate. Since the position of the shaft and hence the tap 118 is representative of *x*, the potential taken off the potentiometer 110 becomes a derived product D*x* which is fed back by channel 128 to comparison means 130 to which the D*x* signal output from attenuator 62 is also fed. Comparison means 130 is a summing network and the derived product D*x* fed through channel 128 is negative so that at the output terminal of comparison means 130 a signal representative of the true D*x* minus the derived D*x* is obtained. If this error is zero then the *x* position selected by the servo motor 122 is correct. Howeevr, if it is not zero the error signal will be amplified in preamplifier 132 and in amplifier 134 before being fed to signal winding 126. The gain of the preamplifier 132 is variable, being controlled by the output of the isolation transformer, to maintain constant loop gain and assure stability. The signal imposed on the motor 122 by signal winding 126 will cause the motor to move in such direction as to move its shaft 120 to a position which corrects the tap 118 toward the proper value of *x*. The correction continues until a proper value of *x* achieved. At the same time the curtain 66 is being driven through drive means 68 to its proper position as determined by the derived *x* coordinate.

The *y* coordinate servo system is essentially the same as the *x* coordinate servo system and corresponding parts are therefore shown by corresponding designators with the addition of primes thereto. Of course, the signal derived from the attenuator 64 is a D*y* signal instead of a D*x* signal and the position assumed by the movable tap 118′ is a *y* position instead of an *x* position. However as the shaft 120′ corrects the position of the tap 118′ it also corrects the position of the curtain 70 through its drive system 72 to which that shaft is coupled.

The present invention has been described in terms of a specific embodiment particularly adapted for use with the Skyscreen camera. It will be obvious to those skilled in the art that the computer in the form shown can be used in systems other than the Skyscreen camera. It will also be obvious that the computer can be modified in various respects even for the same use. Instead of rotational servo motors, for example, linear moving actuators might be used. For a fixed focal length situation the need for adjustable attenuators 62 and 64 may be obviated. Other changes of this sort will be apparent to those skilled in the art.

Also apparent to those skilled in the art will be the fact that the resolver system or a combination of units similar to resolvers shown can be employed to produce electrical output proportional to the products of trigonometric functions of mechanical inputs to the various resolvers, or the like, which may be useful in many applications. With the same types of devices, or with other devices, other trigonometric functions may be derived and their products with trigonometric functions obtained by similar technique.

Likewise the comparison means provided by the servo loop whereby a potentiometer is adjusted in order to position its tap at a position representative of a derived value of an unknown *x* has many other applications. Wherever a product D*x* is present together with separately derived value for D, where D is representative of the voltage across the potentiometer, this system may be used to solve for the value of $x$ and position something accordingly. In any of its applications beyond the specific computer shown here, the system itself can be substantially modified within the principles explained. Furthermore, the computer system need not be used in a system where two such systems are used but may be used in a system where only one such system is used or in one where more than two systems are used.

Other modifications of the computer and its systems described herein will occur to those skilled in the art and such modifications are intended to be within the scope and spirit of the present invention.

We claim:

1. A computer comprising: a combination of units responsive to mechanical inputs thereto to produce a plurality of electrical output signals each proportional to the product of a trigonometric function of said mechanical input; means for combining said electrical output signals to produce a first signal representing the product D$x$ where $x$ is an unknown quantity to be determined by said computer, and to produce a second signal representing D; and means supplied with said D$x$-representing signal and said D-representing signal to produce a final output signal representative of said quantity x, said last named means having a control element and supplied with said D-representing signal for producing a derived D$x$ signal representing a product of D times an $x$ value adjustable by adjustment of said control element, comparison means for comparing said D$x$-representing signal with said derived D$x$ signal to produce indications of differences between them, and means for adjusting said control element until said D$x$-representing signal and said derived D$x$ signal are equal, at which time the state of said control element will indicate the position of said unknown $x$.

2. The computer defined in claim 1 in which the combination of units comprises a resolver section with a plurality of resolvers and a source of reference excitation applied to at least one of said resolvers.

3. The computer defined in claim 2 in which said means supplied with said D$x$-representing signal and said D-representing signal includes a potentiometer across which said D-representing signal is applied and having a movable tap whose position represents $x$ so that potential at the tap is a derived D$x$, a servo motor for changing the position of the tap of the potentiometer, comparison means for comparing the known D$x$ signal with the derived D$x$ signal and producing an error signal in the event of difference to which comparison means is applied the known D$x$ signal, feedback means for feeding the derived D$x$ signal from the potentiometer tap to said comparison means and means applying any errior signal derived from said comparison means to said servo motor to correct the position of said potentiometer tap to the position representing the correct value of $x$ at which time the known D$x$ and the derived D$x$ will be equal.

References Cited

UNITED STATES PATENTS

| | | | |
|---|---|---|---|
| 2,688,440 | 9/1954 | Gray et al. | 235—150.261 |
| 3,015,446 | 1/1962 | Ville et al. | 235—189 |
| 3,078,042 | 2/1963 | Grado | 235—189 X |
| 3,174,033 | 3/1965 | Seliger | 235—196 X |
| 3,251,982 | 5/1966 | Kemmer et al. | 235—193 X |

MALCOLM A. MORRISON, Primary Examiner

FELIX D. GRUBER, Assistant Examiner

U.S. Cl. X.R.

235—186, 193, 195, 196; 330—12